United States Patent
Papadimitriou et al.

(10) Patent No.: US 7,054,307 B2
(45) Date of Patent: May 30, 2006

(54) METHOD, APPARATUS AND SYSTEM FOR MANAGING SUBSCRIBER DATA

(75) Inventors: Dimitrios Papadimitriou, Dallas, TX (US); Sean Kendall Schneyer, New York, NY (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1058 days.

(21) Appl. No.: 09/751,971

(22) Filed: Dec. 29, 2000

(65) Prior Publication Data

US 2002/0087575 A1    Jul. 4, 2002

(51) Int. Cl.
*H04L 12/66* (2006.01)

(52) U.S. Cl. .............. 370/353; 370/328; 370/331; 370/354; 370/355; 370/356; 455/433; 455/436

(58) Field of Classification Search .............. 370/252, 370/254, 310, 328, 329, 331, 332, 342, 349, 370/352, 353, 354, 355, 356; 455/432.1, 455/433, 435, 436, 437, 438, 439, 440, 442
See application file for complete search history.

(56) References Cited

U.S. PATENT DOCUMENTS

| 6,661,782 | B1 * | 12/2003 | Mustajarvi et al. | 370/331 |
| 6,731,932 | B1 * | 5/2004 | Rune et al. | 455/432.1 |
| 6,763,233 | B1 * | 7/2004 | Bharatia | 455/433 |
| 2003/0039237 | A1 * | 2/2003 | Forslow | 370/352 |

FOREIGN PATENT DOCUMENTS

WO     WO 00 18171 A    3/2000

* cited by examiner

*Primary Examiner*—Dang Ton
*Assistant Examiner*—Shick Hom (57) ABSTRACT

The present invention provides a method, apparatus and system for managing subscriber data in a telecommunications system. The present invention receives one or more messages from a mobile station. The one or more messages received may be a routing area update request signal. Subsequently, the present invention requests the subscriber data from a home location register. The subscriber data contains circuit switching data, packet switching data, or circuit switching data and packet switching data. Then, the subscriber data is stored in the new universal visitor location register. The present invention may request the subscriber data from the home location register by sending an update location signal to the home location register.

32 Claims, 8 Drawing Sheets

Fig.10

METHOD, APPARATUS AND SYSTEM FOR MANAGING SUBSCRIBER DATA

TECHNICAL FIELD OF THE INVENTION

This invention relates generally to the field of telecommunications, and more particularly, to a method, apparatus and system for managing subscriber data in a telecommunications system.

BACKGROUND OF THE INVENTION

Without limiting the scope of the invention, this background of the present invention is in connection with the network architecture for telecommunications systems, particularly the third generation wireless systems. The popularity, complexity and scope of wireless communication networks have increased dramatically over the last few years. The complexity is especially increased with the addition of customers' capability of subscribing to circuit switching services as well as to packet switching services. The addition not only enlarged the scope of wireless telecommunications capability, but also increased the traffic in signaling among the devices within the network. As a result, network owners and service providers are looking for ways to reduce the signaling traffic among the devices within the network while maintaining the wide scope of wireless service.

What is needed is a method and system for a better way to manage subscriber data that is transferred back and forth between the network devices in order to provide service to the mobile subscribers.

SUMMARY OF THE INVENTION

The present invention has many advantages. As an example, the present invention reduces the signaling traffic among the devices within the network. More specifically, the present invention reduces the signaling between the signaling node for packet switching services ("SGSN") and the mobile switching center for circuit switching services ("MSC/VLR") toward the home location register ("HLR") when the mobile station ("MS") moves to a new Routing/Location/Service area. As used herein, a change in service area may occur when a subscriber moves from one node to another or any other event that requires an area update. As a result of the present invention, many of the signaling between these devices are reduced, if not completely eliminated. For instance, the signaling between both the SGSN at the new and old service areas and the HLR are not only reduced, but eliminated. The signaling between the SGSN at the new service area and the SGSN at the old service area is also eliminated. The signaling between both the MSC/VLR at the new and old service areas and the HLR are also eliminated.

Furthermore, for a mobile subscriber who is capable of using both packet and circuit switching services, the present invention only executes one LOCATION UPDATE procedure when the mobile subscriber roams into a new service area. The present invention, further, reduces the signaling over the Gs interface, i.e., the signaling in the current interface between the MSC/VLR and the SGSN. In addition, the present invention eliminates unnecessary duplication of subscriber data in the SGSN and the MSC/VLR. As a result, managing subscriber data is much simpler and easier.

In addition to reducing the signaling traffic among the network devices, the present invention also reduces the complexity and coordination between the network devices, namely, the SGSN, the MSC/VLR, the HLR and the MS. And consequently, the present invention offers an easier and more consistent way of handling subscriber status, the different indicators and timers related to the subscriber status. Moreover, the present invention no longer requires reservation of TMSI series to avoid allocation of the same TMSI to two different mobile subscribers. In addition, the present invention further reduces the amount of time and signaling it takes to restore the network devices when they are down.

More specifically, the present invention provides a method, apparatus and system for managing subscriber data in a telecommunications system. The present invention first receives one or more messages from a mobile station. The one or more messages received may be a routing area update request signal. Subsequently, the present invention requests the subscriber data from a home location register. The subscriber data contains circuit switching data, packet switching data, or circuit switching data and packet switching data. Following the request, the present invention receives the subscriber data from the home location register. Then, the present invention stores the subscriber data in the new universal visitor location register. In requesting the subscriber data from the home location register, the present invention may send an update location signal to the home location register.

In an embodiment of the present invention, one or more messages is sent to the old universal visitor location register and in response, one or more messages from the old universal visitor location register is received. The one or more messages sent to the old universal visitor location register may be a context request signal and the messages received from the old universal visitor location register may be a context response signal.

After requesting the subscriber data from the home location register, the home location register sends one or more messages to the old universal visitor location register. The old universal visitor location register sends one or more messages to the home location register in response to the messages received from it. The one or more messages sent to the old universal visitor location register may be a cancel location signal and the messages sent by the old universal visitor location register in response may be a cancel location acknowledgment signal.

In accordance to another embodiment of the present invention, a method for restoring subscriber data of a mobile station in one or more network devices is provided. The method begins by receiving a request to restore the subscriber data from one or more of the network devices. The subscriber data containing circuit switching data, packet switching data, or circuit switching data and packet switching data. Thereafter, one or more indicators are set in a first database, and the first database coordinates with at least a second database to make the subscriber data consistent.

Alternatively, another embodiment of the present invention includes the step of determining whether the subscriber data requested is stored in the universal visitor location register. If the subscriber data is not stored in the universal visitor location register, then the universal visitor location register receives the subscriber data from the home location register.

In accordance with an embodiment of the present invention, the universal visitor location register checks several indicators or flags to determine the status of a subscriber's data. A first indicator is set only if the one or more network devices are only providing circuit switching services, i.e., a mobile switching center. The first indicator indicates whether the universal visitor location register record of location area identity is confirmed by radio contact. The first indicator may be termed as "Confirmed by Radio Contact." A second indicator is set to indicate whether the subscriber data stored in the universal visitor location register is consistent with the subscriber data stored in the home location register. The second indicator may be termed as "Subscriber Data Confirmed by HLR." A third indicator is set to indicate whether the home location register record of the universal visitor location register number of the mobile station is confirmed by radio contact. The third indicator may be termed as "Location Information Confirmed in HLR."

Another embodiment of the present invention provides a telecommunications system that has a home location register containing subscriber data of one or more mobile subscribers. The subscriber data contains circuit switching data, packet switching data, or circuit switching data and packet switching data. The system further includes a universal visitor location register communicably linked to the home location register. The universal visitor location register is for receiving the permanent subscriber data contained in the home location register and for storing permanent and temporary subscriber data for subscribers roaming within the area covered by the universal visitor location register. The system may also include one or more network devices connected to the universal visitor location register. The one or more network devices are for providing one or more types of telecommunications services to the one or more mobile subscribers based upon the subscriber data.

The one or more network devices may include one or more mobile switching centers for providing circuit switching services to the one or more mobile subscribers or one or more signaling nodes for providing packet switching services to the one or more mobile subscribers. Other features and advantages of the present invention shall be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. For example, in addition to mobile or cellular telecommunications, the present invention may be applicable to other forms of communications, such as communications via satellite, or any form of communications not yet known to man as of the date of the present invention. The specific embodiments discussed herein are merely illustrative of specific ways to make and use the invention and do not limit the scope of the invention.

The present invention reduces the signaling traffic among the devices within the network. More specifically, the present invention reduces the signaling between the signaling node for packet switching services ("SGSN") and the mobile switching center for circuit switching services ("MSC/VLR") toward the home location register ("HLR") when the mobile station ("MS") moves to a new Routing/Location/Service area. As used herein, a change in service area may occur when a subscriber moves from one node to another or any other event that requires an area update. As a result of the present invention, many of the signaling between these devices are reduced, if not completely eliminated. For instance, the signaling between both the SGSN at the new and old service areas and the HLR are not only reduced, but eliminated. The signaling between the SGSN at the new service area and the SGSN at the old service area is also eliminated. The signaling between both the MSC/VLR at the new and old service areas and the HLR are also eliminated.

Furthermore, for a mobile subscriber who is capable of using both packet and circuit switching services, the present invention only executes one LOCATION UPDATE procedure when the mobile subscriber roams into a new service area. The present invention, further, reduces the signaling over the Gs interface, i.e., the signaling in the current interface between the MSC/VLR and the SGSN. In addition, the present invention eliminates unnecessary duplication of subscriber data in the SGSN and the MSC/VLR. As a result, managing subscriber data is much simpler and easier.

In addition to reducing the signaling traffic among the network devices, the present invention also reduces the complexity and coordination between the network devices, namely, the SGSN, the MSC/VLR, the HLR and the MS. And consequently, the present invention offers an easier and more consistent way of handling subscriber status, the different indicators and timers related to the subscriber status. Moreover, the present invention no longer requires reservation of TMSI series to avoid allocation of the same TMSI to two different mobile subscribers. In addition, the present invention further reduces the amount of time and signaling it takes to restore the network devices when they are down.

Figure 1:
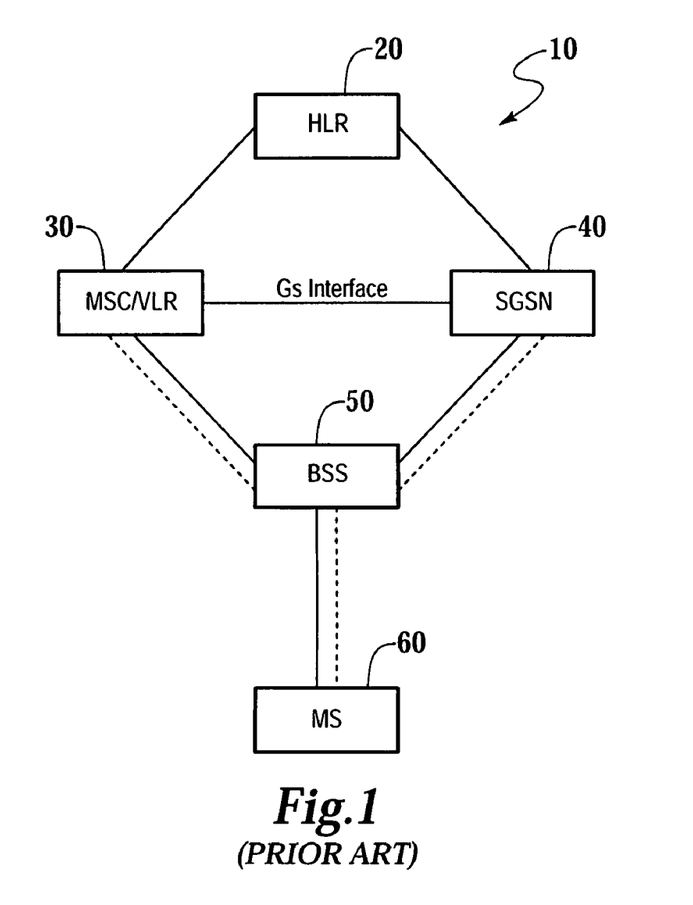
FIG 1. depicts a block diagram illustrative of a prior art mobile telecommunications system.

Referring to FIG. 1, a block diagram illustrative of an existing (prior art) mobile telecommunications system 10 is shown. Typically, a mobile telecommunications system 10 includes a home location register ("HLR") 20, a mobile switching center with a visitor location register ("MSC/VLR") 30, a signaling node ("SGSN") 40, a base station system ("BSS") 50, and a mobile station ("MS") 60. Each of the network devices are communicably linked to each other. The solid lines represent signaling or control paths, while the dashed lines represent call or transport paths.

The MSC/VLR 30 typically provides call set-up, routing, control and termination operations in providing telecommunication services to the MS 60. More importantly, MSC/VLR 30 is the node responsible for providing circuit switching services to the MS 60, while the SGSN 40 is the node that is responsible for providing packet switching services to the MS 60.

The HLR 20 stores location and subscriber data of mobile subscribers registered in the network, such as MS 60. The location information changes as the MS 60 moves around. The MS 60 sends its location data (via the MSC/VLR 30 or SGSN 40) to its HLR 20, which permits the MS 60 to receive calls.

The MSC/VLR 30 includes a visitor location register ("VLR"), which is a database that stores and retrieves permanent and temporary subscriber data for visiting mobile subscribers. The SGSN 40 includes a subscriber database that stores and retrieves temporary location and subscriber data for visiting mobile subscribers, and permanent subscriber data for mobile subscribers assigned to the area covered by the SGSN 40. Various subscriber data is passed between the HLR 20 and the VLR, and the HLR 20 and the SGSN 40, e.g., subscribers service subscriptions when the MS 60 is roaming either in a home network or in a visited network.

This separation of databases (VLR and SGSN) is maintained even for mobile subscribers that use both circuit and packet switching services. Because of this database separation, when the MS 60 moves to a new service area, both the SGSN 40 and MSC/VLR 30 contact the HLR 20 to receive subscriber data.

In addition, the SGSN 40 provides signaling back and forth with the MSC/VLR 30 to coordinate the statuses of the MS 60 and the implicit detach/automatic de-registration timers in order to avoid conflicting operations. A subscriber's data or record is removed from the SGSN 40 after the expiration of an automatic de-registration timer. Thus, for mobile subscribers who subscribe to both packet and circuit switching services, subscribers' data are coordinated through the Gs interface between the SGSN 40 and the MSC/VLR 30. Consequently, the use of the two databases for subscriber data management creates unnecessary problems with coordination and excessive signaling between the databases.

As shown in FIG. 1, all the signaling and call paths go through the BSS 50. Call paths exist between the MS 60 and the BSS 50, between the BSS 50 and the MSC/VLR 30, and between BSS 50 and SGSN 40. Signaling paths exist between MS 60 and BSS 50, between BSS 50 and MSC/VLR 30, between BSS 50 and SGSN 40, between MSC/VLR 30 and SGSN 40, between MSC/VLR 30 and HLR 30, and between SGSN 40 and HLR 20.

In an embodiment of the present invention, the two databases (VLR and SGSN) are merged into one database named universal visitor location register ("UVLR"). The UVLR has the capacity, among other things, to store subscriber data for both circuit and packet switching services. This drastically reduces the number of messages that the MSC/VLR, SGSN and HLR must handle to maintain proper coordination. As a result, a system in accordance with the present invention is less complex and more efficient that current systems. For example, in one embodiment of the present invention, the UVLR contacts the HLR only once when a combined ROUTING AREA/LOCATION UPDATE is performed. In another embodiment of the present invention, the UVLR coordinates internally any timers or subscriber statuses.

Figure 2:
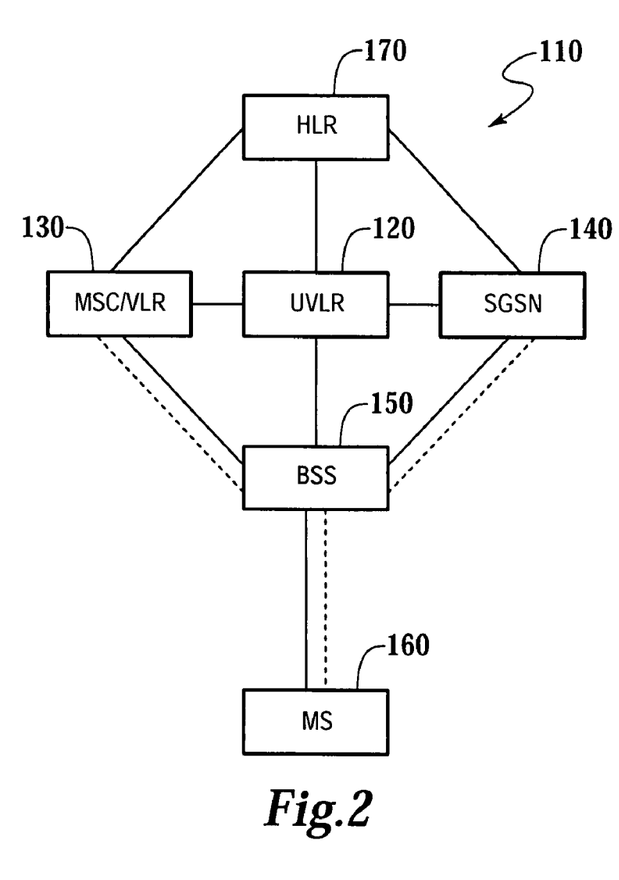
FIG. 2 depicts a block diagram illustrative of a mobile telecommunications system in accordance with an embodiment of the present invention.

Referring now to FIG. 2, a block diagram illustrative of a mobile telecommunications system 110 in accordance with an embodiment of the present invention is shown. The system or network 110 includes all of the network devices in the prior art telecommunications system 10, except for the databases that are included in the MSC/VLR 30 and SGSN 40. The system 110 includes an additional device—a universal visitor location register 120. The universal visitor location register 120 replaces the functionality of the databases in the MSC/VLR 30 and SGSN 40. That is, all the subscriber data that was stored in the MSC/VLR 30 and SGSN 40 are now stored in the UVLR 120. In other words, the subscriber data that were repeated in the MSC/VLR 30 and the SGSN 40 are now stored in the UVLR 120 only once. All the subscriber data are stored under the same IMSI root. This embodiment of the present invention enables the MSC 130 and the SGSN 140 to obtain the subscriber data from the same data tree.

In analyzing the call and signaling paths, all the signaling and call paths go through the BSS 150. Likewise, the signaling and call paths exist between the MS 160 and BSS 150, between the BSS 150 and the SGSN 140, and between the BSS 150 and the MSC 130. However, in accordance with the embodiment of the present invention, all signaling paths between the MSC 130 and the HLR 170, and between the SGSN 140 and the HLR 170 are non-existent. Those signaling paths that exist in FIG. 1 between the MSC/VLR 30 and the HLR 20, and between the SGSN 40 and the HLR 20 are replaced with the signaling paths between the MSC 130 and the UVLR 120, between the SGSN 140 and the UVLR 120, and between the UVLR 120 and the HLR 170. FIG. 2 also illustrates an optional signaling path, i.e., a path between the UVLR 120 and the BSS 150.

An embodiment of the present invention relates to subscriber data management; all other functionalities that are normally performed by the SGSN and the MSC remain the same. That is, the current interfaces from the SGSN towards the SGSN database and the MSC towards the VLR remain unchanged. In other words, the traffic-related parts of the MSC and the SGSN will not be altered in order to communicate with the UVLR. The messages or information contained in the signals also remain the same. Consequently, these functionalities will not be discussed in this disclosure.

Figure 3:
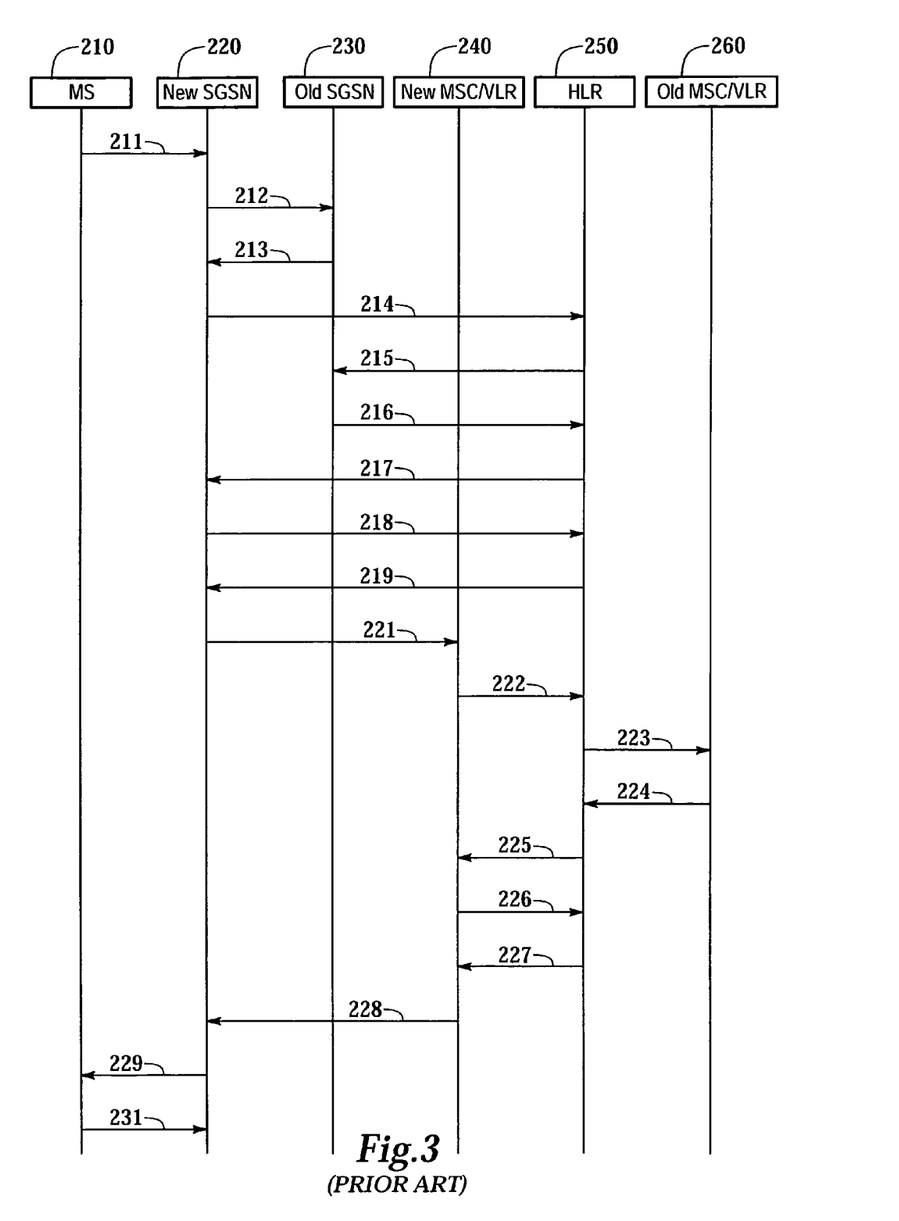
FIG. 3 depicts a signaling sequence diagram illustrative of the current method of managing subscriber data in a mobile telecommunications system.
Figure 4:
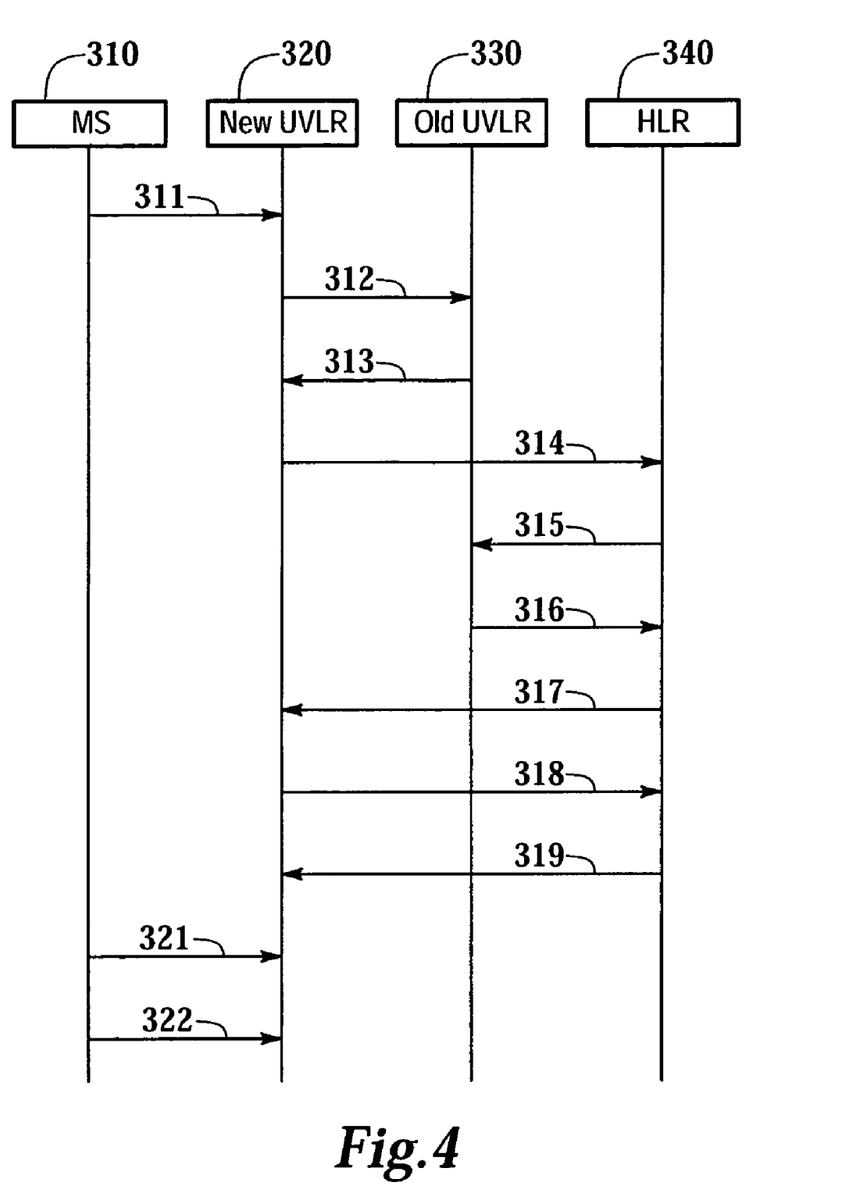
FIG. 4 depicts a signaling sequence diagram illustrative of the method of managing subscriber data in a mobile telecommunications system in accordance with an embodiment of the present invention.
Figure 5:
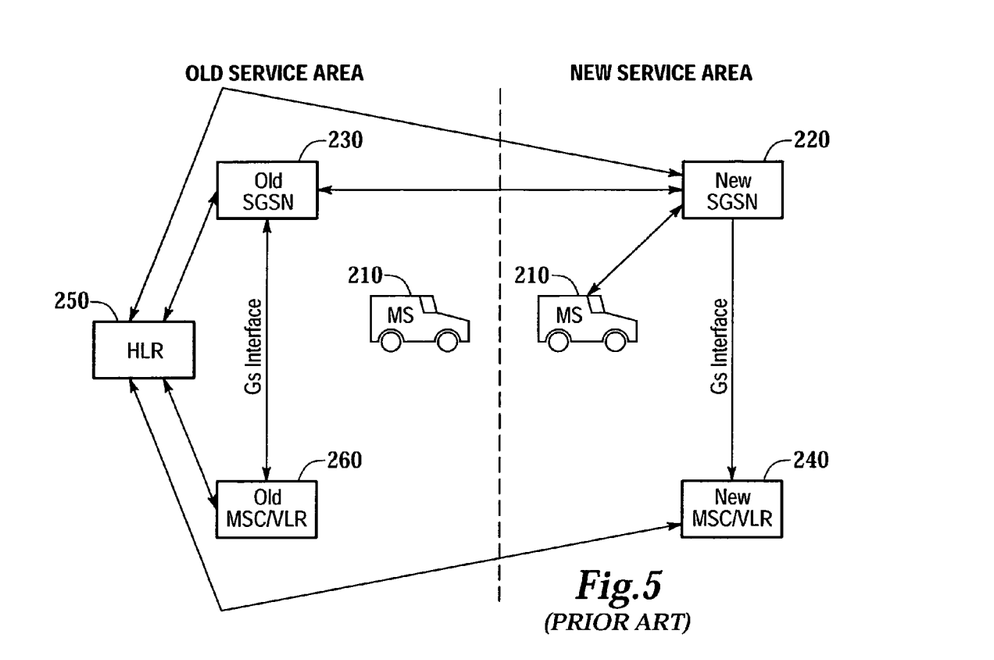
FIG. 5 depicts a block diagram corresponding to FIG. 3.

FIGS. 3–5 are merely illustrative of a specific operation of a mobile subscriber, i.e., when the mobile subscriber roams from an old service area to a new service area. In FIGS. 3–5, the mobile subscriber subscribes to both the packet and circuit switching services. The present invention, however, is not limited by the examples and illustrations given in these figures.

Referring to FIG. 3, a signaling sequence diagram illustrative of an existing (prior art) method of managing subscriber data in a mobile telecommunications system is shown. The diagram begins with MS 30 sending a ROUTING AREA UPDATE REQUEST signal 211 to the New SGSN 220 upon entering the new service area. As a result, the New SGSN 220 sends a CONTEXT REQUEST signal 212 to the Old SGSN 230, and in response, the Old SGSN 230 sends a CONTEXT RESPOND signal 213 to the New SGSN 220. Next, the New SGSN 220 sends an UPDATE LOCATION signal 214 to the HLR 250. The HLR 250, then, sends a CANCEL LOCATION signal 215 to the Old SGSN 230 and in response, the Old SGSN 230 sends a CANCEL LOCATION ACKNOWLEDGMENT signal 216 to the HLR 250. Subsequently, the HLR 250 sends an INSERT SUBSCRIBER DATA signal 217 to the New SGSN 220 and in response, the New SGSN 220 sends an INSERT SUBSCRIBER DATA ACKNOWLEDGMENT signal 218 to the HLR 250. The HLR 250 then sends an UPDATE LOCATION ACKNOWLEDGMENT signal 219 to the New SGSN 220.

Upon successful completion of the update location at the New SGSN 220, the New SGSN 220 sends a LOCATION UPDATE REQUEST signal 221 to the New MSC/VLR 240. Subsequently, the MSC/VLR 240 sends an UPDATE LOCATION signal 222 to the HLR 250. The HLR 250 then sends a CANCEL LOCATION signal 223 to the Old MSC/VLR 260 and in response, the Old MSC/VLR 260 sends a CANCEL LOCATION ACKNOWLEDGMENT signal 224 to the HLR 250. The HLR 250 then sends an INSERT SUBSCRIBER DATA signal 225 to the New MSC/VLR 240 and the MSC/vLR 240 sends an INSERT SUBSCRIBER DATA ACKNOWLEDGMENT signal 226 in return. Afterwards, the HLR 250 sends an UPDATE LOCATION ACKNOWLEDGMENT signal 227 to the New MSC/VLR 240, and the New MSC/VLR 240 sends a LOCATION UPDATE ACCEPT signal 228 to the New SGSN 220. The New SGSN 220 then sends a ROUTING AREA UPDATE ACCEPT signal to the MS 210, and the MS 210 sends a ROUTING AREA UPDATE COMPLETE signal 231 to the New SGSN 220.

Referring to FIG. 4, a signaling sequence diagram illustrative of a method of managing subscriber data in a mobile telecommunications system in accordance with an embodiment of the present invention is shown. MS 310 is shown to send a ROUTING AREA UPDATE REQUEST signal 311 to the New UVLR 320 upon entering a new service area. Consequently, the New UVLR 320 sends a CONTEXT REQUEST signal 312 to the Old UVLR 330 with the Old UVLR 330 sending a CONTEXT RESPONSE signal 313 to the New UVLR 320 in return. Upon receiving the CONTEXT RESPONSE signal 313, the New UVLR 320 sends an UPDATE LOCATION signal 314 to the HLR 340. The HLR 340, in turn, sends a CANCEL LOCATION signal 315 to the Old UVLR 330 with the Old UVLR 330 sending a CANCEL LOCATION ACKNOWLEDGMENT signal 316 to the HLR 340. The HLR 340 then sends an INSERT SUBSCRIBER DATA signal 317 to the New UVLR 320 with the New UVLR 320 sending an INSERT SUBSCRIBER DATA ACKNOWLEDGMENT signal 318 to the HLR 340. Subsequently, the HLR 340 sends an UPDATE LOCATION ACKNOWLEDGMENT signal 319 to the New UVLR 320. The New UVLR 320 then sends a ROUTING AREA UPDATE ACCEPT signal 321 to the MS 310, and the MS 310 sends a ROUTING AREA UPDATE COMPLETE signal 322 to the New UVLR 320.

In comparing FIG. 4 with FIG. 3, it is apparent that the method shown in FIG. 4 contains less signal messages than the method shown in FIG. 3. More specifically, signals 221 through 228 are eliminated from the method shown in FIG. 4. Another important difference between FIGS. 3 and 4 is that the subscriber data is only updated once instead of twice.

Figure 6:
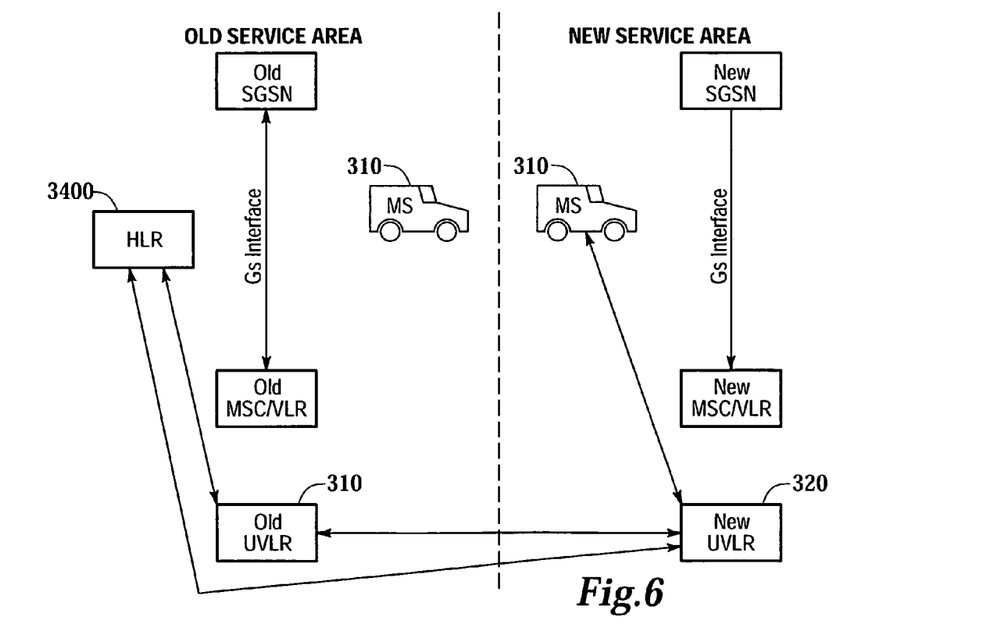
FIG. 6 depicts a block diagram corresponding to FIG. 4.

The reduction in signaling traffic within the system as a result of the embodiment of the present invention is more evident upon viewing FIGS. 5 and 6. FIG. 5 is a block diagram corresponding to FIG. 3 while FIG. 6 is a block diagram corresponding to FIG. 4. The signaling traffic that exist between the New SGSN 220 and the Old SGSN 230, between the New SGSN 220 and HLR 250, between the Old SGSN 230 and HLR 250, between the Old MSC/VLR 260 and HLR 250, between the New MSC/VLR 240 and HLR 250, between the MS 210 and the New SGSN 220, as shown in FIG. 5, have all been replaced by the signaling traffic between the New UVLR 320 and the Old UVLR 310, between the Old UVLR 310 and the HLR 340, and between the New UVLR 320 and the HLR 340, and between the MS 310 and the New UVLR 320.

Figure 7:
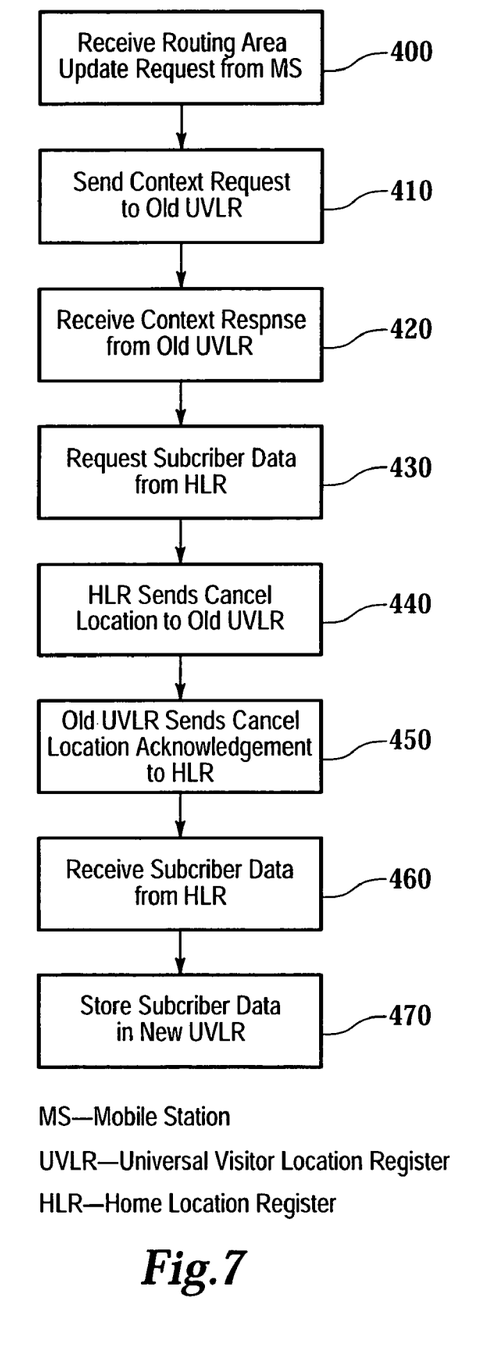
FIG. 7 depicts a flow diagram of a method of managing subscriber data in a mobile telecommunications system in accordance with an embodiment of the present invention.

Referring to FIG. 7, a flow diagram of a method of managing subscriber data in a mobile telecommunications system in accordance with an embodiment of the present invention is shown. In block 400, a routing area update request signal is received from the MS at the New UVLR when the MS roams into a new service area. Subsequently, in block 410 the New UVLR sends a context request signal to the Old UVLR and receives a context response signal from the Old UVLR, as in block 420. Block 430 depicts the New UVLR requesting the subscriber data from the HLR. In response to the request sent by the UVLR, the HLR sends a cancel location signal to the Old UVLR, as in block 440, followed by the Old UVLR sending a cancel location acknowledgment signal to the HLR, as in block 450. Then, the New UVLR receives the subscriber data from the HLR in block 460, and the subscriber data is then stored in the New UVLR, as in block 470.

Figure 8:
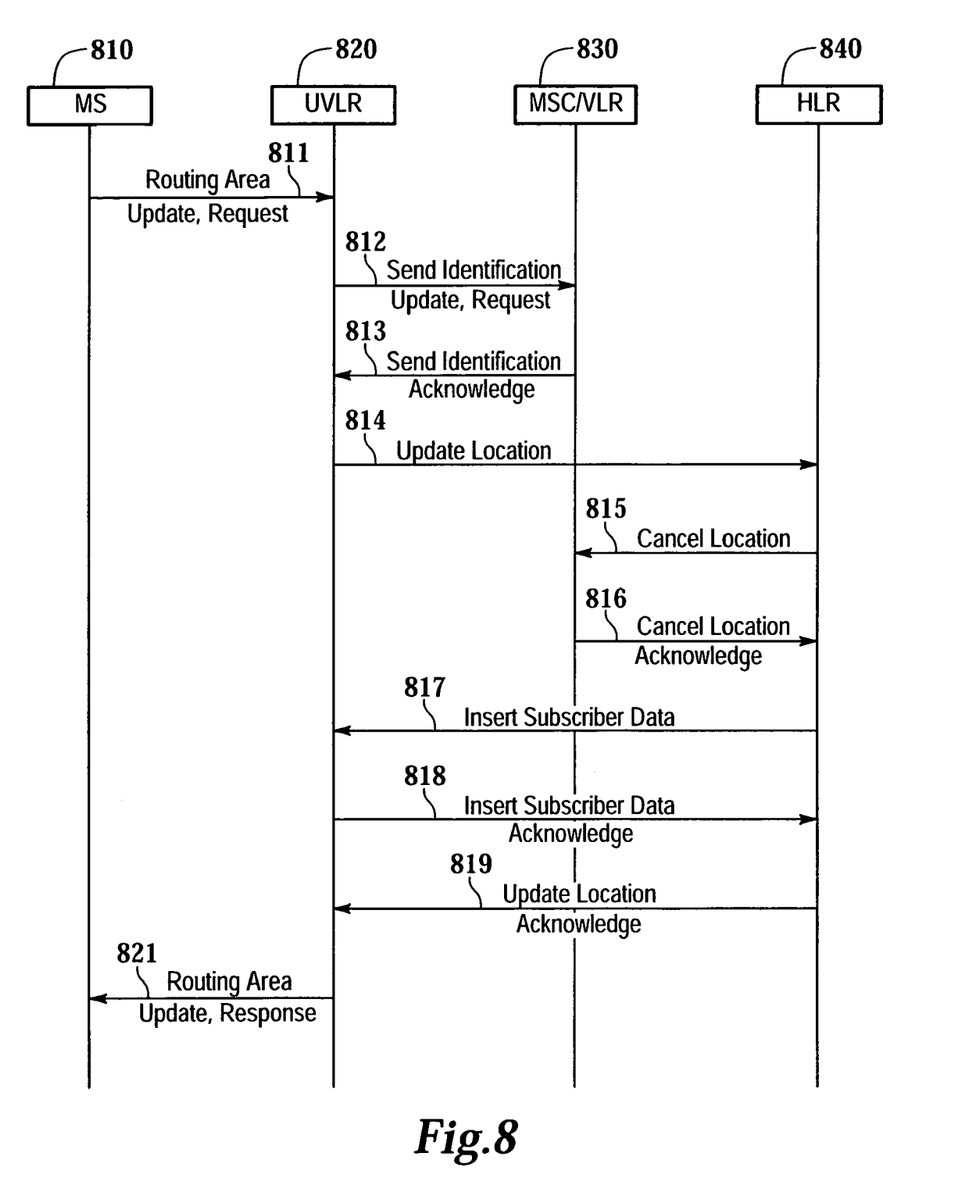
FIG. 8 depicts signaling sequence diagrams illustrative of a subscriber moving from an area covered by a MSC/VLR to an area covered by a universal visitor location register in a mobile telecommunications system in accordance with an embodiment of the present invention.

Referring to FIG. 8, a signaling sequence diagrams illustrative of a subscriber moving from an area covered by a MSC/VLR 830 to an area covered by a UVLR 820 in a mobile telecommunications system in accordance with an embodiment of the present invention is shown. Note that the procedure is symmetrical when a subscriber moves from an area covered by a. UVLR 820 to an area covered by a MSC/VLR 830

MS 810 is shown to send a ROUTING AREA UPDATE REQUEST 811 to the New UVLR 820 upon entering a new service area. Consequently, the New UVLR 820 send a SEND IDENTIFICATION signal 812 to the Old MSC/VLR 830 with the Old MSC/VLR 830 sending an SEND IDENTIFICATION ACKNOWLEDGMENT signal 813 to the New UVLR 820 in return. Upon receiving the SEND IDENTIFICATION ACKNOWLEDGMENT signal 813, the New UVLR 820 sends an UPDATE LOCATION signal 814 to the HLR 840. The HLR 840, in turn, sends a CANCEL LOCATION signal 815 to the Old MSC/VLR 830 with the Old MSC/VLR 830 sending a CANCEL LOCATION ACKNOWLEDGMENT signal 816 to the HLR 840. The HLR 840 then sends an INSERT SUBSCRIBER DATA signal 817 to the New UVLR 820 with the New UVLR 820 sending an INSERT SUBSCRIBER DATA ACKNOWLEDGMENT signal 818 to the HLR 840. Subsequently, the HLR 840 sends an UPDATE LOCATION ACKNOWLEDGMENT signal 819 to the New UVLR 820. The New UVLR 820 then sends a ROUTING AREA UPDATE RESPONSE signal 821 to the MS 810.

Figure 9:
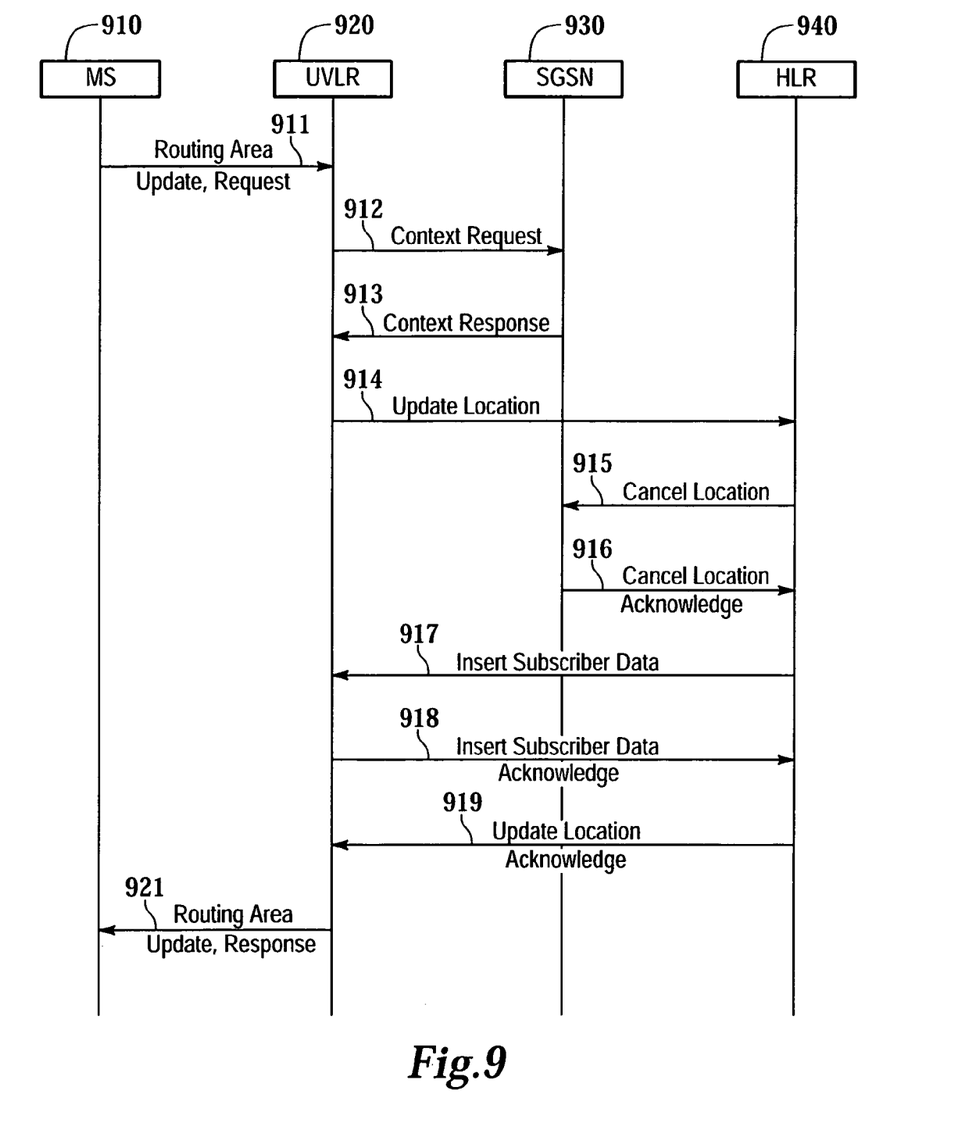
FIG. 9 depicts signaling sequence diagrams illustrative of a subscriber moving from an area covered by a SGSN to an area covered by a universal visitor location register in a mobile telecommunications system in accordance with an embodiment of the present invention.

Now referring to FIG. 9, a signaling sequence diagram illustrative of a subscriber moving from an area covered by a SGSN 930 to an area covered by a UVLR 920 in a mobile telecommunications system in accordance with an embodiment of the present invention is shown. Note that the procedure is symmetrical with a subscriber moves from an area covered by a UVLR 920 to an area covered by a SGSN 930.

MS 910 is shown to send a ROUTING AREA UPDATE REQUEST 911 to the New UVLR 920 upon entering a new service area. Consequently, the New UVLR 920 sends an CONTEXT REQUEST signal 912 to the Old SGSN 930 with the Old SGSN 930 sending an CONTEXT RESPONSE signal 913 to the New UVLR 920 in return. Upon receiving the CONTEXT RESPONSE signal 913, the New UVLR 920 sends an UPDATE LOCATION signal 914 to the HLR 940. The HLR 940, in turn, sends a CANCEL LOCATION signal 915 to the Old SGSN 930 with the Old SGSN 930 sending a CANCEL LOCATION ACKNOWLEDGMENT signal 916 to the HLR 940. The HLR 940 then sends an INSERT SUBSCRIBER DATA signal 917 to the New UVLR 920 with the New UVLR 920 sending an INSERT SUBSCRIBER DATA ACKNOWLEDGMENT signal 918 to the HLR 940. Subsequently, the HLR 940 sends an UPDATE LOCATION ACKNOWLEDGMENT signal 919 to the New UVLR 920. The New UVLR 920 then sends a ROUTING AREA UPDATE RESPONSE signal 921 to the MS 910.

Figure 10:
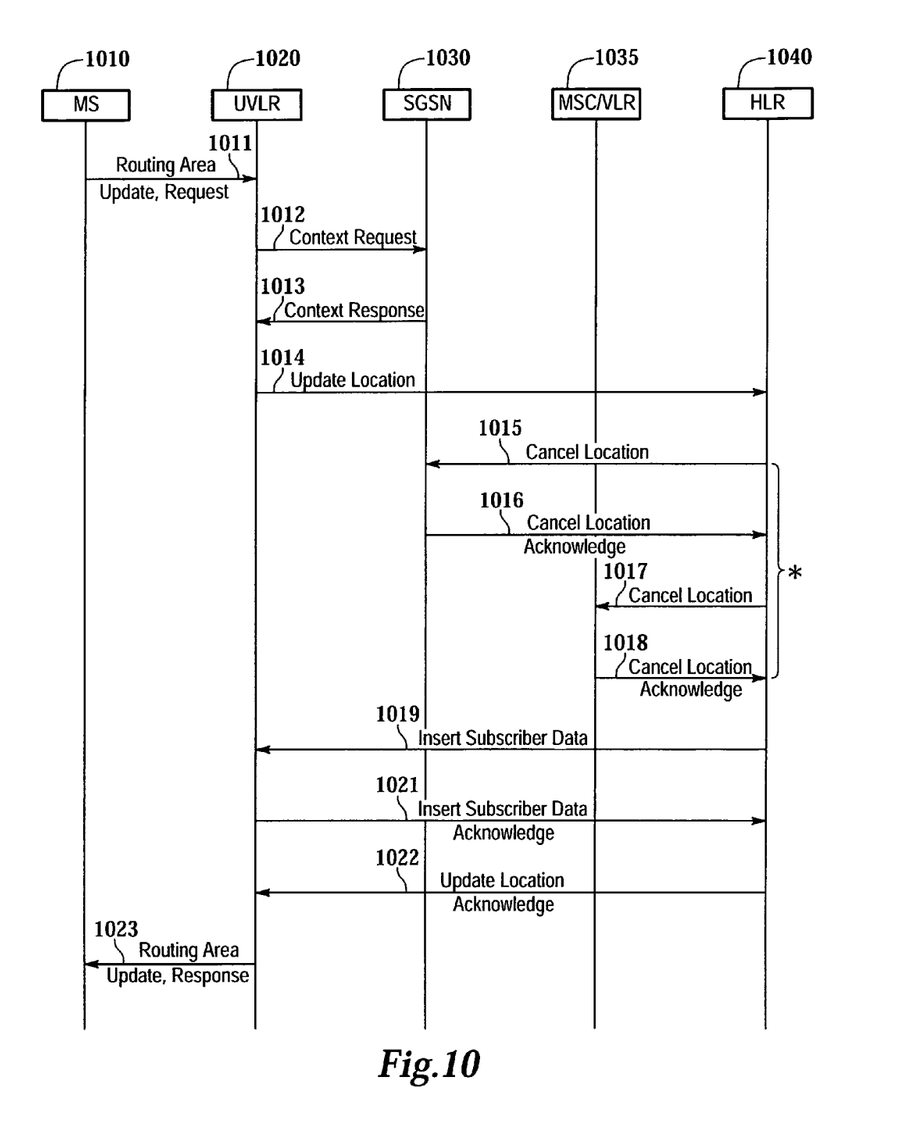
FIG. 10 depicts signaling sequence diagrams illustrative of a dual service subscriber moving from an area covered by a SGSN and a MSC/VLR to an area covered by a universal visitor location register in a mobile telecommunications system in accordance with an embodiment of the present invention.

Now referring to FIG. 10, a signaling sequence diagrams illustrative of a dual service subscriber moving from an area covered by a SGSN 1030 and a MSC/VLR 1035 to an area covered by a UVLR 1020 in a mobile telecommunications system in accordance with an embodiment of the present invention is shown. Note that the procedure is roughly symmetrical with a dual service subscriber moves from an area covered by a UVLR 1020 to an area covered by a SGSN 1030 and MSC/VLR 1035 (only one cancellation message is sent to the UVLR).

MS 1010 is shown to send a ROUTING AREA UPDATE REQUEST 1011 to the New UVLR 1020 upon entering a new service area. Consequently, the New UVLR 1020 sends an CONTEXT REQUEST signal 1012 to the Old SGSN 1030 with the Old SGSN 1030 sending an CONTEXT RESPONSE signal 1013 to the New UVLR 1020 in return. Upon receiving the CONTEXT RESPONSE signal 1013, the New UVLR 1020 sends an UPDATE LOCATION signal 1014 to the HLR 1040. The HLR 1040, in turn, sends a CANCEL LOCATION signal 1015 to the Old SGSN 1030 with the Old SGSN 1030 sending a CANCEL LOCATION ACKNOWLEDGMENT signal 1016 to the HLR 1040. The HLR 1040 also sends a CANCEL LOCATION signal 1017 to the Old MSC/VLR 1035 with the Old MSC/VLR 1035 sending a CANCEL LOCATION ACKNOWLEDGMENT signal 1018 to the HLR 1040. As indicated by the asterisk "*", the HLR 1040 currently expects separate update location messages from the SGSN 1030 and MSC/VLR 1035. As a result, the HLR 1040 issues different cancel location messages 1015 and 1017. In this case though, the HLR 1040 should send cancel location messages to both although it receives only one update location message. This is a change in current HLR 1040 behavior. The HLR 1040 then sends an INSERT SUBSCRIBER DATA signal 1019 to the New UVLR 1020 with the New UVLR 1020 sending an INSERT SUBSCRIBER DATA ACKNOWLEDGMENT signal 1021 to the HLR 1040. Subsequently, the HLR 1040 sends an UPDATE LOCATION ACKNOWLEDGMENT signal 1022 to the New UVLR 1020. The New UVLR 1020 then sends a ROUTING AREA UPDATE RESPONSE signal 1023 to the MS 1010.

Subscriber data is restored in the UVLR in the same manner as it is currently restored in a MSC/VLR or SGSN. In essence the databases coordinate with each other so that the subscriber data is consistent. A request to restore subscriber data is received at the UVLR. Upon receiving the request, the subscriber data is retrieved from the HLR if the UVLR contains the subscriber data. Then, the UVLR changes the restoration indicator associated with the restored subscriber data within the UVLR database.

The universal visitor location register checks several indicators or flags to determine the status of a subscriber's data. A first indicator is set only if the one or more network devices are only providing circuit switching services, i.e., a mobile switching center. The first indicator indicates whether the universal visitor location register record of location area identity is confirmed by radio contact. The first indicator may be termed as "Confirmed by Radio Contact." For mobile subscribers who subscribe to only General Packet Radio Service ("GPRS"), this indicator remains "Not Confirmed." However, for mobile subscribers who subscribe to both services, GPRS and non-GPRS, the indicator is updated normally.

A second indicator is set to indicate whether the subscriber data stored in the universal visitor location register is consistent with the subscriber data stored in the home location register. The second indicator may be termed as "Subscriber Data Confirmed by HLR." This indicator is set to "Confirmed" when the UVLR performs a successful Update Location or Restore Data operations to the HLR.

A third indicator is set to indicate whether the home location register record of the universal visitor location register number of the mobile station is confirmed by radio contact. The third indicator may be termed as "Location Information Confirmed in HLR." This indicator is set to "Confirmed" upon successful completion of the Update Location to the HLR or after a Provide Roaming Number request is received for a subscriber that has no IMSI record within the UVLR.

In one embodiment of the present invention, one timer that controls the "attach" or "implicit detach" state of the subscriber record and another timer that controls the automatic de-registration process in accordance with the present invention. These timers stop when a mobile subscriber contacts the network and start when the contact ends.

The existing system currently reserves a TMSI series for SGSN-connected mobile subscribers and the rest of the series for MSC/VLR-connected mobile subscribers. In accordance with an embodiment of the present invention, this reservation of TMSI series is not needed for the UVLR. Since all the mobile subscribers are handled in the same database, a common TMSI allocation mechanism is used.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of managing subscriber data in a telecommunications system, wherein said telecommunications system comprises a first switch for providing circuit switching services and a second switch for providing packet switching services, said method comprising the steps of:
  receiving one or more messages from a mobile station;
  requesting the subscriber data from a first database, wherein the subscriber data includes circuit switching data and packet switching data and wherein said first database maintains and stores said subscriber data associated with said mobile station and wherein in response to the step of requesting the subscriber data from the first database, communicating one or more messages between the first database and a third database;

receiving the subscriber data from the first database; and storing the subscriber data in a second database serving a particular service area currently covering said mobile station, wherein the second database is communicably coupled to the first switch for providing circuit switching services to the mobile station within said service area, and is communicably coupled to the second switch for providing packet switching services to the mobile station within said service area.

2. The method as recited in claim 1, wherein the first database is a home location register.

3. The method as recited in claim 1, wherein the second database is a universal visitor location register located in a new service area.

4. The method as recited in claim 1, wherein the step of requesting the subscriber data from the first database comprises the step of sending one or more messages to the first database to request the subscriber data.

5. The method as recited in claim 1, wherein the third database is a universal visitor location register located in an old service area.

6. The method as recited in claim 1, wherein the third database is a serving GPRS (General Packet Radio Service) support node (SGSN) located in an old service area.

7. The method as recited in claim 1, wherein the third database is a Visitor Location Registry (VLR) located in an old service area.

8. The method as recited in claim 4, wherein the one or more messages being sent to the first database to request the subscriber data is an update location signal.

9. The method as recited in claim 4, wherein the one or more messages received from the mobile station at the second database is a routing area update request signal.

10. The method as recited in claim 1, wherein the one or more messages being sent to the third database is a context request signal.

11. The method as recited in claim 1, wherein the one or more messages received from the third database is a context response signal.

12. The method as recited in claim 1, wherein the one or more messages being sent to the third database is a send identification signal.

13. The method as recited in claim 1, wherein the one or more messages received from the third database is a send identification acknowledgment signal.

14. The method as recited in claim 1, wherein the step of communicating one or more messages between the first database and the third database comprises the steps of:

sending one or more messages from the first database to the third database; and sending one or more messages from the third database to the first database in response to the one or more messages sent from the first database.

15. The method as recited in claim 14, wherein the one or more messages being sent to the third database is a cancel location signal.

16. The method as recited in claim 14, wherein the one or more messages being to the first database is a cancel location acknowledgment signal.

17. The method as recited in claim 1, wherein the mobile station is roaming from an old service area to a new service area.

18. A telecommunications system comprising:

a first database containing subscriber data of one or more mobile subscribers, wherein the subscriber data includes circuit switching data and packet switching data;

a second database communicably linked to the first database, wherein the second database receives the subscriber data contained in the first database and stores the subscriber date for subscribers roaming within a service area covered by the second database;

a third database communicably linked to the first database for selectively communicating one or more messages between the first database and the third database in response to a request for said subscriber data from the first database;

a circuit switching network device connected to the second database, said circuit switching network device providing circuit switching telecommunications services to the one or more mobile subscribers within said service area based upon the subscriber data stored within said second database; and a packet switching network device connected to the second database, said packet switching network device providing packet switching telecommunications services to the one or more mobile subscribers within said service area based upon the subscriber data stored within said second database.

19. The system as recited in claim 18, further comprising one or more service areas, wherein each service area includes one or more first databases, the second database, the circuit switching network device, and the packet switching network device.

20. The system as recited in claim 18, wherein the first database is a home location register.

21. The system as recited in claim 18, wherein the second database is a universal visitor location register.

22. The system as recited in claim 18, wherein the circuit switching network device is a mobile switching center for providing circuit switching services to the one or more mobile subscribers.

23. The system as recited in claim 18, wherein the packet switching network device is a signaling node for providing packet switching services to the one or more mobile subscribers.

24. A computer program embodied on a computer readable medium, said computer program managing subscriber data in a telecommunications system, said computer program comprising:

a code segment for receiving one or more messages from a mobile station;

a code segment for requesting the subscriber data from a first database, wherein the subscriber data includes circuit switching data and packet switching data;

code segment for selectively communicating one or more messages between the first database and a third database in response to the step of requesting the subscriber data from the first database;

a code segment for receiving the subscriber data from the first database;

a code segment for storing the subscriber data in a second database wherein said second database is associated with a service area currently covering said mobile station;

a code segment for providing the subscriber data from the second database to a circuit switching network device for providing circuit switching services to one or more mobile stations within said service area; and a code segment for providing the subscriber data from the second database to a packet switching network device for providing packet switching services to one or more mobile stations within said service area.

25. The computer program as recited in claim 24, wherein the code segment for requesting the subscriber data from the first database comprises a code segment for sending one or more messages to the first database to request the subscriber data.

26. The system as recited in claim 18, wherein the third database is a universal visitor location register located in an old service area.

27. The system as recited in claim 18, wherein the third database is a serving GPRS (General Packet Radio Service) support node (SGSN) located in an old service area.

28. The system as recited in claim 18, wherein the third database is a Visitor Location Register (VLR) located in an old service area.

29. The computer program as recited in claim 24 wherein the first database is a home location register.

30. The computer program as recited in claim 24 wherein the second database is a universal visitor location register located in a new service area.

31. The computer program as recited in claim 24 wherein the third database is a universal visitor location register located in an old service area.

32. The computer program as recited in claim 24 wherein the third database is a serving GPRS (General Packet Radio Service) support node (SGSN) located in an old service area.

* * * * *

UNITED STATES PATENT AND TRADEMARK OFFICE
CERTIFICATE OF CORRECTION

PATENT NO. : 7,054,307 B2
APPLICATION NO. : 09/751971
DATED : May 30, 2006
INVENTOR(S) : Papadimitriou et al.

It is certified that error appears in the above-identified patent and that said Letters Patent is hereby corrected as shown below:

Column 11, Line 58, in Claim 16, after "being" insert -- sent --.

Column 12, Line 4, in Claim 18, delete "date" and insert -- data --, therefor.

Signed and Sealed this

Eighteenth Day of December, 2007

JON W. DUDAS
*Director of the United States Patent and Trademark Office*